Nov. 14, 1933.  S. P. WINTHER, JR  1,935,004
HYDRAULIC AEROPLANE CONTROL
Filed Oct. 21, 1932  4 Sheets-Sheet 1

Inventor
S. P. Winther, Jr.

By Clarence A. O'Brien
Attorney

Nov. 14, 1933.   S. P. WINTHER, JR   1,935,004
HYDRAULIC AEROPLANE CONTROL
Filed Oct. 21, 1932   4 Sheets-Sheet 3
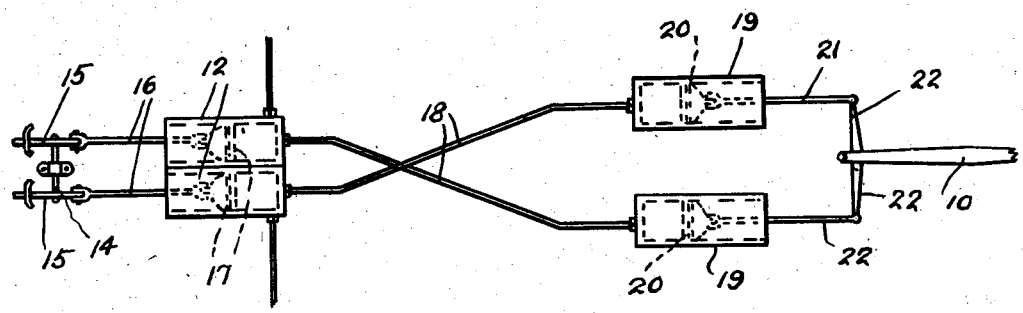
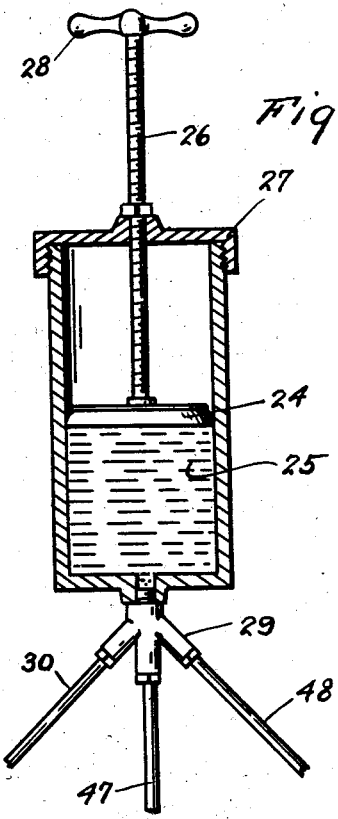
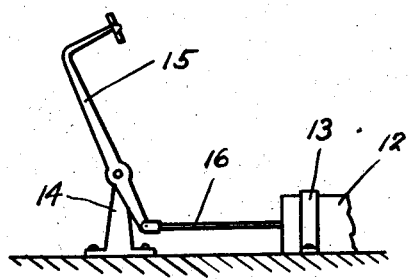
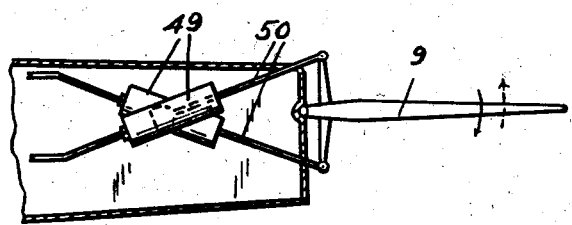
Inventor
S. P. Winther, Jr.
By Clarence A. O'Brien
Attorney

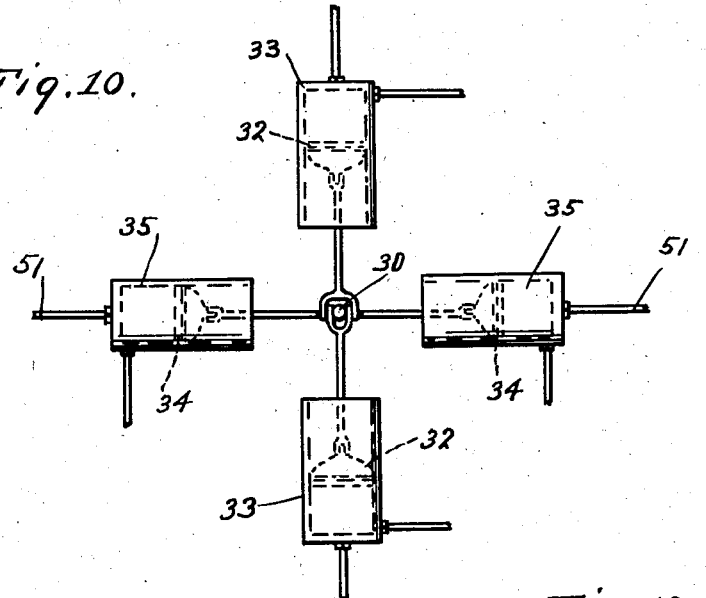
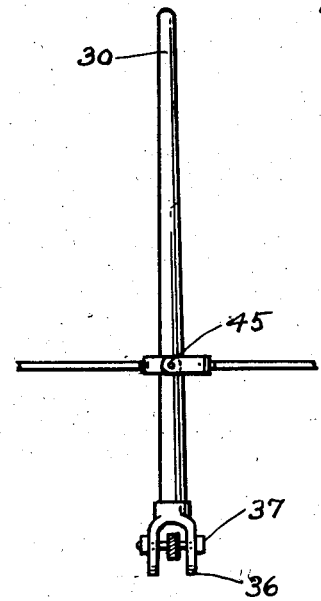
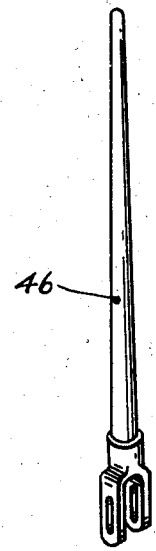
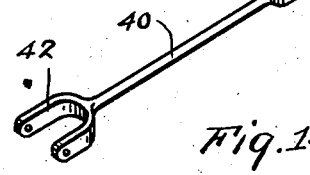
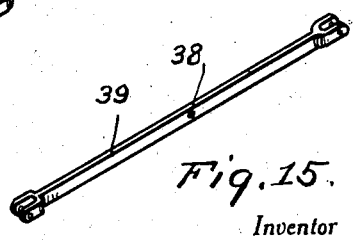

Patented Nov. 14, 1933

1,935,004

UNITED STATES PATENT OFFICE 1,935,004

HYDRAULIC AEROPLANE CONTROL

Simon Peter Winther, Jr., New York, N. Y.

Application October 21, 1932. Serial No. 638,957

1 Claim. (Cl. 244—29)

This invention relates to new and useful improvements in controls for aircraft and more particularly to a hydraulic system for operating the various controls of aircraft.

The principal object of the present invention is to provide a control for aircraft wherein the usual rudder, ailerons, and elevator can be controlled in an easy and positive-acting manner.

Other important objects and advantages of the invention will become apparent to the reader of the following specification.

In the drawings:—

Fig. 4 represents a longitudinal sectional view through the fuselage of an aircraft showing the drive means for the elevator.

Fig. 5 represents a diagrammatic view disclosing the transmitting and drive means for the rudder.

Fig. 6 represents a fragmentary side elevational view of one of the foot pedals and transmitting cylinders for the operating means shown in Fig. 5.

Fig. 7 represents a longitudinal sectional view through any one of the cylinders.

Fig. 8 represents an end elevational view of any one of the cylinders.

Fig. 9 represents a vertical sectional view through the oil reservoir.

Fig. 10 represents a diagrammatic view disclosing the joy stick operated for transmitting cylinders for the ailerons and elevator.

Fig. 11 represents a side elevational view of the joy stick.

Fig. 12 represents a perspective view of the joy stick detached from associated details.

Fig. 13 represents a perspective view of one of the connecting rods between the joy stick and one of the pistons of one of the cylinders shown in Fig. 10.

Fig. 14 represents a perspective view of another size connecting rod employed in the same capacity as the rod shown in Fig. 13.

Fig. 15 represents a perspective view of the joy stick supporting beam.

Figure 1:
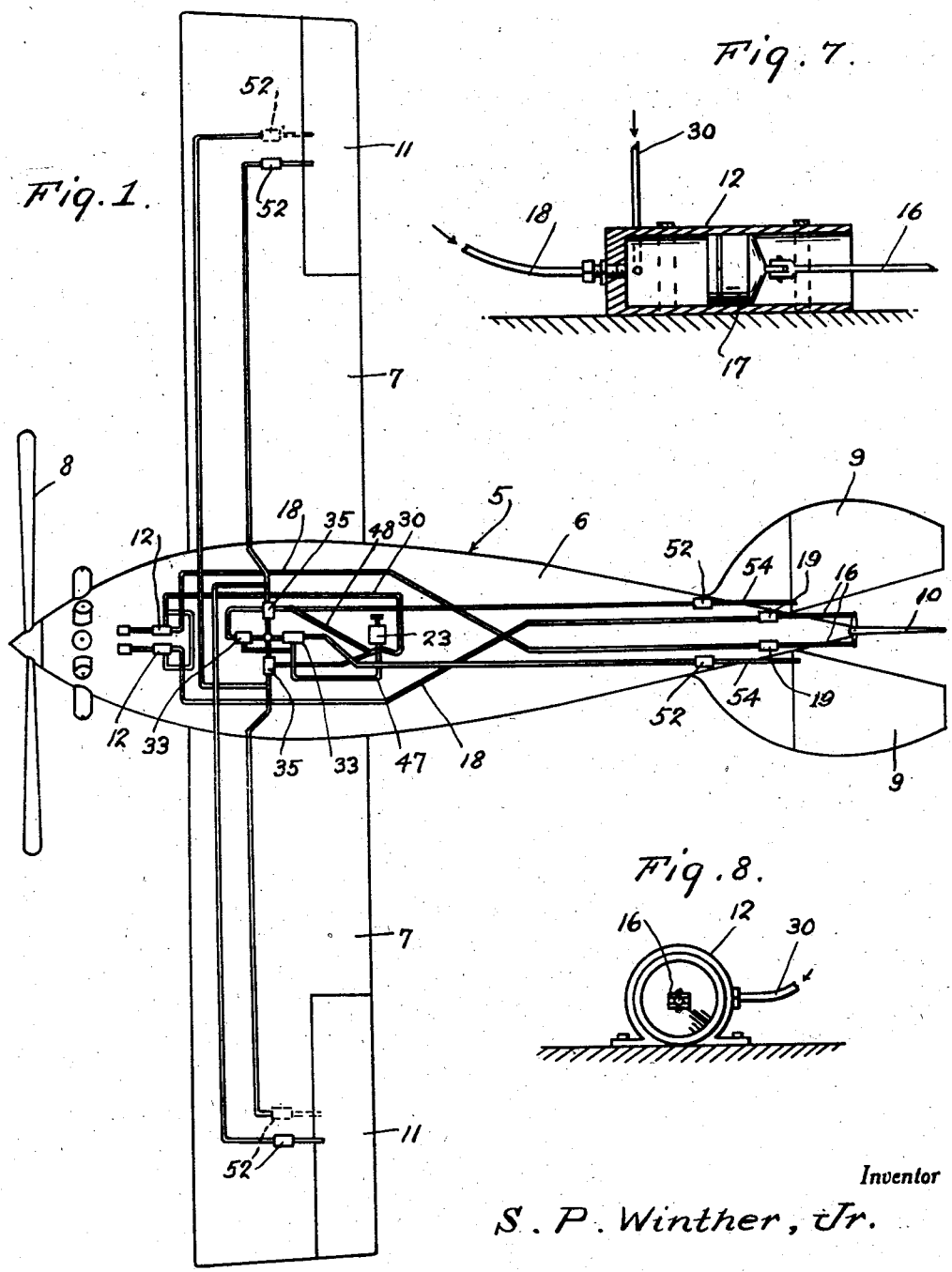
Figure 1 represents a top plan view of an aircraft showing diagrammatically the system of pipes and fluid drive means.

Referring to the drawings wherein like numerals designate like parts, it can be seen in Fig. 1, that numeral 5 generally refers to an aircraft consisting of the fuselage 6 and the wings 7—7. Numeral 8 represents the usual propellor, while numerals 9—9 represent the elevators.

The rudder 10 is shown in Fig. 1 between the elevators while at the end of the wings 7—7 are the usual ailerons 11. It will be observed, in the drawings, that in the cabin or at the pilot's cockpit is what may be termed fluid transmitting means while at the control, whether it be the elevators, the rudder, or the ailerons, are cylinders and pistons which may be termed driving means.

The fluid transmitting means for the elevators 9 consists of a pair of cylinders 12—12, secured by suitable means 13 to the floor of the craft. Suitable bracket means 14 support the rockable foot lever 15 which has a connecting rod 16 extending from the lower end thereof to a piston 17 in the cylinder 12. (See Fig. 5.)

Pipe lines 18 extend from the cylinders 12 and are crossed and connect at their rear ends to the cylinders 19 in which the pistons 20 are operative. Numeral 21 represents a connecting rod extending from each of the pistons 20 to an arm 22 on the rudder 10.

Referring to Fig. 1, it can be seen that numeral 23 represents a reservoir which is shown in detail in Fig. 9. This reservoir 23 has a follower 24 operative therein and fed downwardly against the oil conduit 25 thereof by the screw 26, the same being threaded thru the end 27 of the reservoir, and can be conveniently operated by the handle 28 at the upper end thereof.

A manifold fitting 29 has a lower outlet end of the reservoir with a plurality of pipes extending therefrom. The pipe 30 extends to the cylinders 12—12 as shown in Fig. 1. In Fig. 10 numeral 30 represents the joy stick which operates the pistons 32—32 in the fluid transmitting cylinders 33—33, when the joy stick is moved in a forward and rearward direction.

The joy stick when moved transversely to the aircraft operates the pistons 34—34 in the cylinders 35—35. The lower end of the joy stick 30 is provided with a fork 36 through which a pin 37 extends, the same also extending through the opening 38 in the beam 39, the end portions of which are secured to the aforementioned pistons 34—34.

The connecting rods 40—41 connect the joy stick 30 to the pistons 34—34. The connecting rods 40—41 connect the joy stick 30 to the pistons 32—32 each connecting rod being provided, at its end connected to the joy stick with a port 42. These ports have their leg portions overlapping and are apertured as at 43 to receive the pin 45 which is disposed therethrough and also through the opening 26 in the joy stick.

Extending from the reservoir 23 is a pipe 47 which connects to the cylinders 33—33, while another pipe 48 extends from the reservoir 23 communicating with the cylinders 35—35.

As is shown in Fig. 4, each elevator 9 is provided with a pair of crossed cylinders 49—49, properly inclined and provided with connecting rods, and connections 50 between their pistons and the rudder 10 so that when fluid pressure is transmitted by the particular cylinder 35, depending upon which lateral direction the joy stick is moving, the motion of the piston in the corresponding cylinder 49 will be transmitted to the elevator.

Figure 2:
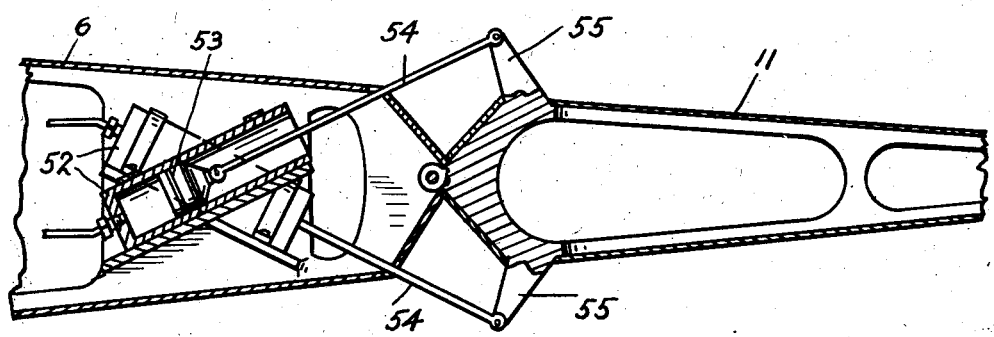
Fig. 2 represents a fragmentary longitudinal sectional view disclosing the aircraft aileron and drive means therefor.
Figure 3:
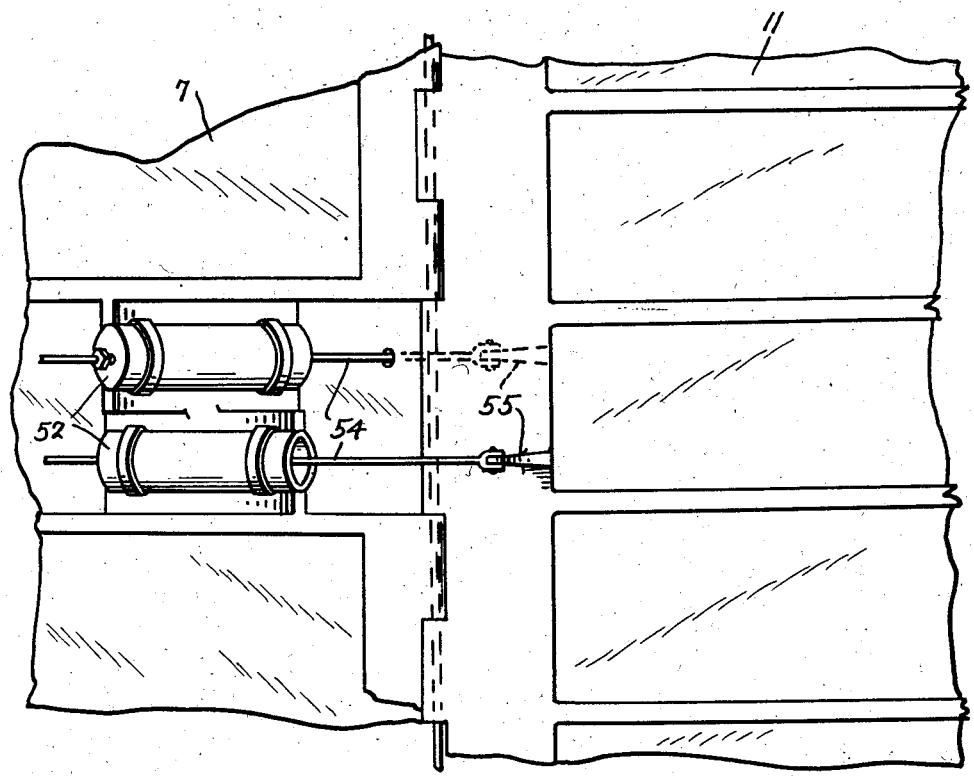
Fig. 3 represents a fragmentary top plan view with parts removed disclosing the drive means for an aileron.

Each of the cylinders 35 has a pipe connection 51 to the corresponding cylinder 52, a pair for each aileron 11 and the cylinders of each pair are crossed in the manner substantially shown in Figs. 2 and 3. In each of the cylinders 52 is a piston 53 through which the connecting rod 54 is connected at one end. The outer end of the connecting rod attaches to the corresponding arm 55 on the ailerons. (See Figs. 2 and 3.)

Obviously, fluid is forced under pressure from the cylinders 35—35 or 33—33 depending upon the direction in which the joy stick 30 is moved. This motion of the joy stick in actuating the transmitters supplies either the drive cylinders of the ailerons or the drive cylinders of the elevators with fluid under pressure (preferably oil) to actuate these controls, while the rudder 10 is actuated manually independently of the joy stick by the foot levers 15.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

Means for operating flight controlling members of aircraft comprising a pair of hydraulic cylinders, a support having a pair of supporting surfaces on oppositely inclined planes, said hydraulic cylinders being secured to said surfaces so as to incline in opposite directions, a pair of adjacent ends of the cylinders being opposed to the controlling member of the aircraft, said cylinders having pistons therein and having fluid inlets, and connecting means between the pistons and the flight controlling member.

SIMON PETER WINTHER, Jr.